United States Patent [19]

Sheeter

[11] Patent Number: 4,790,400
[45] Date of Patent: Dec. 13, 1988

[54] STEPPING VEHICLE

[76] Inventor: Eric Sheeter, C22 Beaver Point Road, RR No. 1, Fulford Harbour, British Colombia, Canada, V0S 1C0

[21] Appl. No.: 75,475

[22] Filed: Jul. 20, 1987

[30] Foreign Application Priority Data

Jul. 24, 1986 [GB] United Kingdom ............... 8618044

[51] Int. Cl.$^4$ ............................................. B62D 57/02
[52] U.S. Cl. ...................................... 180/8.6; 180/8.1; 180/8.3
[58] Field of Search ................... 180/8.1, 8.2, 8.3, 8.4, 180/8.5, 8.6

[56] References Cited

U.S. PATENT DOCUMENTS

| 3,734,220 | 5/1973 | Smith | 180/8.5 |
| 4,265,326 | 5/1981 | Lauber | 180/8.1 |
| 4,662,465 | 5/1987 | Stewart | 180/8.1 |

Primary Examiner—John J. Love
Assistant Examiner—Donn McGiehan
Attorney, Agent, or Firm—Sughrue, Mion, Zinn, Macpeak and Seas

[57] ABSTRACT

A vehicle 1 comprises an upper mounting 2 which is a hollow beam pivotally attached via pivot means 4 to a lower mounting 3 which is also a hollow beam. A work platform 15 is fixed on to the upper mounting for translational movement with the mountings. Inner beams 5, 6, 10 and 11 are slidable within the outer beams 2 and 3 and have attached to each of their ends yokes, which in turn have attached at each of their ends legs 8 and 13. The legs have feet 9 and 14 and are telescopically extendible, so that the weight of the vehicle can be supported alternately on each set of legs i.e. on legs 8 or legs 13. By causing all the inner beams to slide in the outer beams simultaneously while the vehicle is supported on one set of legs and then transferring the weight to the other set of legs and causing the inner beams to slide in the opposite direction, the vehicle can "walk". The work platform can move forward continuously. By rotating the upper and lower mountings relative to each other the vehicle can be steered and caused to travel in any direction.

16 Claims, 5 Drawing Sheets

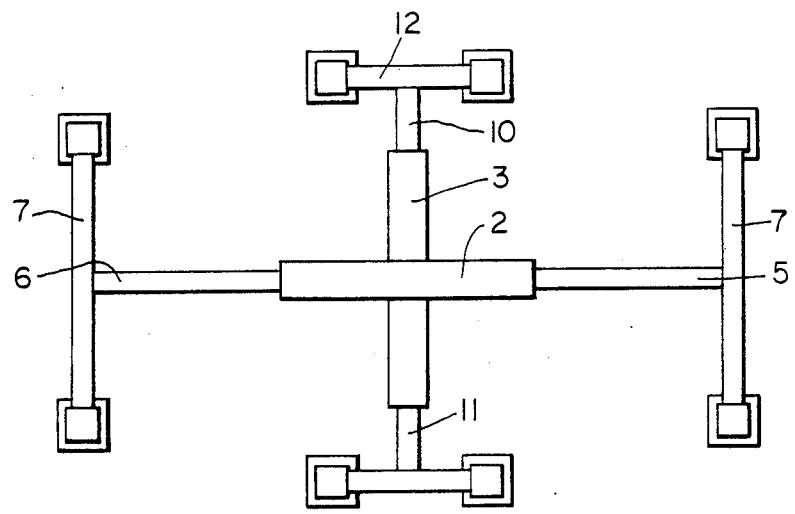
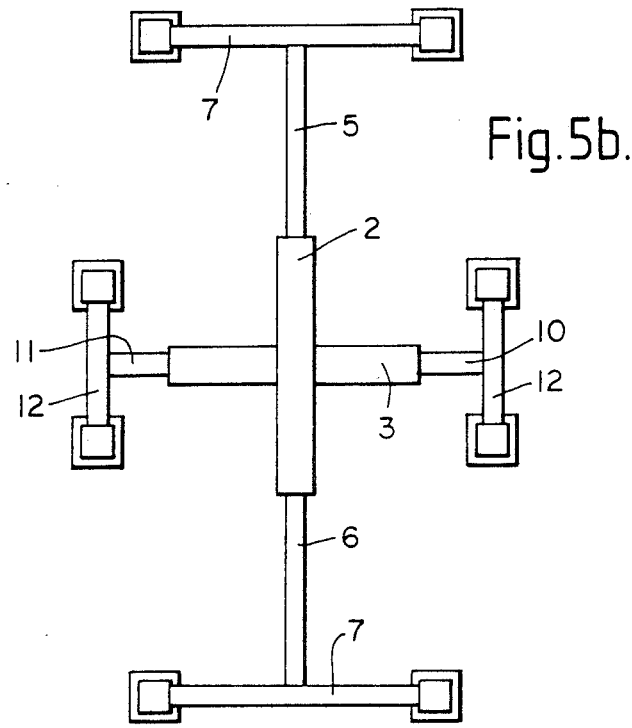

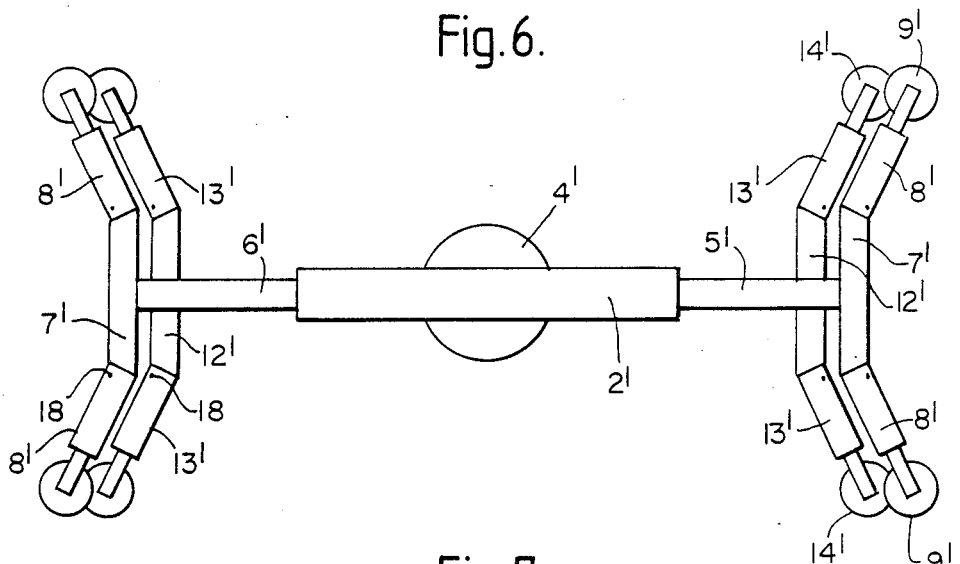
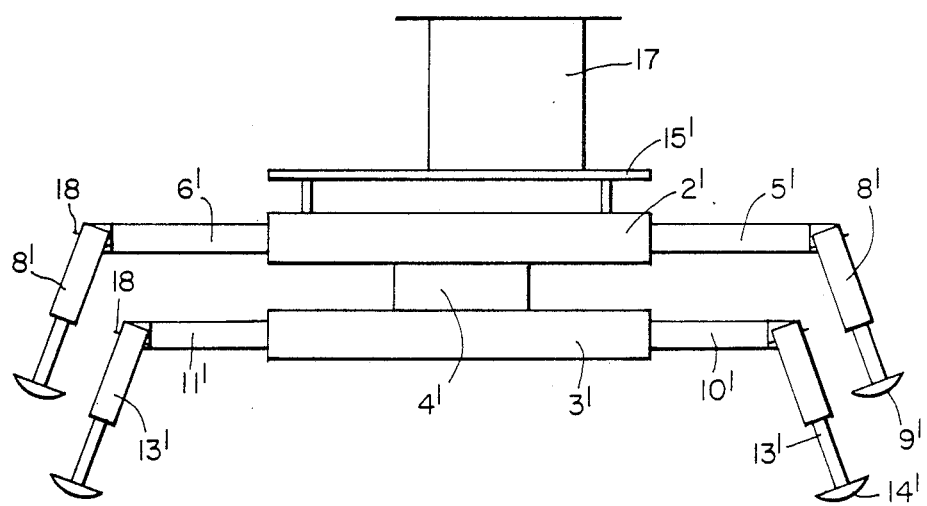

STEPPING VEHICLE

The present invention relates to vehicles whose mode of travel is by a stepping mechanism and which are particularly suitable for use over boggy or rough ground and where substantial ground obstacles are encountered eg in silviculture.

Machinery used in silviculture has various requirements with regard to its function and conditions under which it is used. The ground over which these types of vehicles have to travel is very rough and/or soft and often boggy or wet and/or frozen and/or snow covered. The vehicles may often have to travel up or down or across steep obstacle strewn slopes. Conventional wheeled vehicles and endless track vehicles must be extremely heavy to maintain a firm grip on the ground throughout all conditions. They do not negotiate ground obstacles handily. Such vehicles compact the ground and are unsuitable for travelling over ground where seedlings have been or are to be planted. They are unsuitable over ground where thinning is taking place because they are too large to negotiate the aisles of trees and generally unable to manoeuvre in the way required for this work. They are similarly unsuitable for tending young plantations of trees. They require wide trails within forests, which wastes ground that could otherwise be cultivated. They damage forest roads. In regions which experience a wet season or a spring thaw their weight may preclude their being hauled over both forest roads and public highways.

In U.S. Pat. No. 3,734,220 there is described a work platform, generally for use offshore but which can also be used on shore in soft ground conditions, which has two sets of four legs, the legs of one of the sets being attached to the work platform and the legs of the other set being attached to a rectangular frame mounted on rails beneath the platform. The legs are all retractable and extendible and hydraulic rams enable the frame to be moved relative to the platform. The platform may thus be moved by a sequence in which legs are raised and lowered and the hydraulic rams move the frame relative to the platform. It is possible to skew the frame on the work platform by differential actuation of the hydraulic rams, but only to the extent of a few degrees and so only very limited deviation from straight line travel is possible. Generally vehicles that travel on reciprocable legs are intended to travel only in a straight line, eg mine conveyors in GB 2118500 and 2118996. This makes them all unsuitable for use where steering is necessary.

In DE-C-905 433 a vehicle for use in agriculture is described which comprises a pair of endless tracks on a mounting and a set of four legs attached to a second mounting via left and right beams in which the mountings are mutually rotatable but translationally immovable. The legs are vertically extendible between an extended position at which they bear the weight of the vehicle (the tracks being lifted off the ground) and a retracted position at which they are lifted off the ground (when the tracks bear the weight). These features enable the direction of travel on the tracks to be changed. The second mounting is horizontally translationally slidable with respect to the legs on the beams so that when the legs are in their extended position the first and second mountings and the pair of tracks can be translated horizontally, for instance so as to move from one path to a parallel path. This vehicle when travelling using the four legs moves the main body of the vehicle discontinuously in a "stop-start" motion. The distance between the front legs and the back legs is not variable since they are attached to longitudinal beams of constant length, with respect to which they cannot move.

In EP-A-157633 a vehicle is described comprising upper and lower intermediate bodies which can be pivotally connected to one another via a pivot. The upper and lower intermediate bodies may be connected to upper and lower main bodies, respectively, via slides carried on the main bodies. The upper main body can carry tool for various tasks, one example being a crane jib. A problem with the vehicle is that during walking the load that is carried on the upper main body moves discontinuously by a "stop-start" action even though the length of the step is increased as compared to the system described in DE-C-905433, by the dual slide mechanism.

It would be desirable to provide a vehicle that can carry heavy loads over poor terrain and can easily change direction and the load-bearing platform of which can have a continuous form of movement which makes more controlled and flexible manoeuvering possible and allows a greater rate of progression over the ground.

A vehicle according to the invention comprises:
a first substantially horizontal mounting;
a second substantially horizontal mounting beneath the first mounting;
pivot means by which the first and second mountings are pivotally interconnected;
means for rotating the mountings relative to each other about the pivot through at least about 45°;
substantially horizontal, first and second mounting extensions, each comprising front and rear portions and slidably mounted on, respectively, the first and second mountings for longitudinal motion relative to the mountings;
means for reciprocally sliding each substantially horizontal mounting extension longitudinally relative to its associated mounting, and
first and second sets of supports for alternately supporting the mountings above the ground and that include ground engaging members and that are connected, respectively, to the first and second mounting extensions at the end of the extensions distant from the mountings,
means for raising and lowering the ground engaging members of one set above or below the ground engaging members of the other set whereby each set of supports may alternately serve as a load bearing set of supports that supports the mountings above the ground and the ground engaging members of which are in load bearing contact with the ground,
and in which a work platform is secured on the first or second mountings for substantially horizontal movement with the mountings and the pivot,
and the means for sliding the mounting extensions comprise
means for sliding the mounting extension connected to the load bearing supports in a first direction relative to its associated mounting and thereby moving the pivot in a second, opposite direction relative to the load bearing supports, and
means for simultaneously sliding the other mounting extension relative to its associated mounting in the said second direction.

The invention is illustrated in the accompanying drawings in which:

FIG. 5a is a plan view of the vehicle omitting the work platform in which the lower mounting and supports have been rotated by 90° in an anticlockwise direction from the position shown in FIG. 4;

FIG. 5b is a plan view of the vehicle omitting the work platform in which the upper mounting and supports have been rotated through 90° in an anticlockwise direction from the position shown in FIG. 4.

FIG. 6 is a schematic plan view of a second embodiment of a vehicle according to the invention;

FIG. 7 is a schemative side view of the second embodiment;

Figure 1:
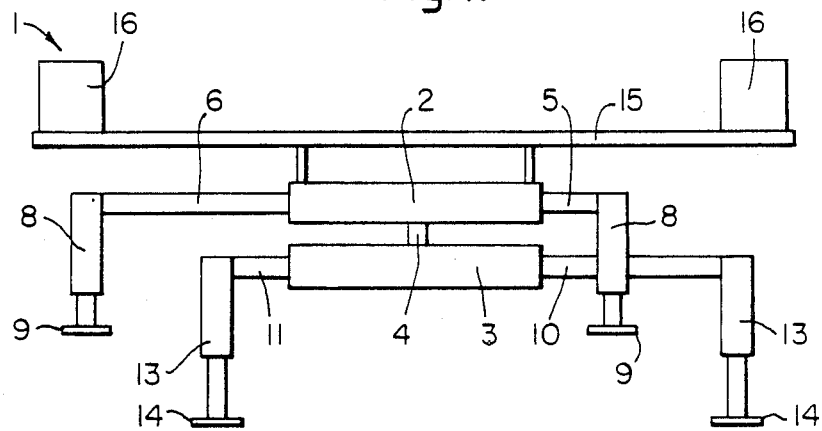
FIG. 1 is a schematic side view of a vehicle according to the invention.

In this specification the terms vertical and horizontal refer to the vehicle when it is standing on flat, level ground on a set of supports of equal height. It will be understood that the vehicle may be tilted or stand on sloping ground.

The vehicle can travel in a longitudinal direction by a simple stepping mechanism and a platform, and therefore any load, tools or personnel on the platform, can move with a motion that is less discontinuous, or "stop-start", in character than prior art systems.

In particular, at any particular time during travel of the vehicle the weight of the mountings and of the entire vehicle is taken by one set of supports, which thus serves as the load bearing supports. The mounting extension to which the load bearing supports are attached is forced to slide in a first substantially horizontal direction relative to its associated mounting. Since the ground engaging members of the load bearing supports are fixed relative to the ground, that mounting, the pivot and the other mounting will thereby travel in a second direction, that is opposite to the first direction. In addition to causing the other mounting to move in this second direction, the extensions of this other mounting simultaneously are caused to slide through it in the second direction so that the supports of this other mounting are then, generally, ahead of the load bearing supports. This set of supports that is now ahead of the load bearing supports are then lowered into load bearing engagement with the ground so as to become the new load bearing supports. The previous load bearing supports can then be retracted and the whole operation repeated.

By appropriate syncronisation of the raising and lowering of the supports and the sliding of the mountings relative to the extensions it is possible to achieve substantially continuous movement of the mountings and the platforms. If the same force is applied to slide both the mounting extensions associated with the load-bearing supports and the other mounting extensions (which are unladen) then the latter will move faster and can therefore be prepared for taking the load early to make the motion of the platform even smoother.

As a result of the mountings being pivotally interconnected it is possible to walk the vehicle in any desired direction merely by pivoting the mountings relative to one another during the stepping motion.

The first and second mountings can take any structural form provided the work platform can be secured to either or both of them and provided each can have substantially horizontal mounting extensions slidably mounted thereon both to the front and rear ends of the mounting portions.

Either or both of the mounting extensions may comprise a single element, for example a beam, having a front portion in front of the pivot and a rear portion to the rear of the pivot. In this case the distance from the front end to the rear end of the elements is constant. Preferably the front and rear portions comprise separate elements, for instance, each may comprise a separate beam.

The extensions are each slidable relative to their associated mounting. When the front and rear portions are separate elements each is usually separately movable relative to its associated mounting. During walking the extensions will generally be caused to move in a manner such that the ground engaging members of the attached set of supports remain approximately equidistantly spaced and thus generally remain a constant length. During other manoeuvres the front and rear extension portions may be moved in opposite directions relative to their associated mountings. This may, for instance, enable the supports of the upper mounting to be extended horizontally beyond those of the lower mounting and/or the supports of the lower mounting to be retracted horizontally between those of the upper mounting, for instance during relative rotation of the mountings.

The sliding movement can be achieved by, for instance, arranging for the front and rear portions of an extension to be reciprocably telescopic but preferably each of the front and rear elements is of constant length and is slid relative to the mounting so as to expose different lengths beyond the end of the mounting.

Preferably the mounting and it associated mounting extension includes slide guides to permit the mounting extension to slide relative to the mountings. The slide guides can comprise spaced apart members but preferably are continuous. Thus preferably one of the mounting and the mounting extension is a hollow beam and the other slides within it. Most preferably each mounting comprises a hollow beam arranged longitudinally with respect to the vehicle and the mounting extension portions each comprise a ram-actuated inner beam received in each end of the hollow beam and slidable within the hollow beam. The inner beam is often hollow. The hollow profile of the outer beam may be cylindrical but is preferably box shaped. The extension will have a profile such that it slides within the hollow outer beam. The outer beams are pivoted to one another, generally at their centres, generally in such a manner that translation of the outer beams relative to each other is not possible. Conveniently the rams are independently operable.

The supports at each end of the mounting extension may comprise a pair of spaced apart legs or other support members so as to give stability to the vehicle. If the mounting extension is relatively narrow, and in particular if the mounting and mounting extension comprises a single beam arrangement it is convenient for the legs to be attached to a transverse yoke which is in turn fixed to the extension portion. The reception of the supports in the extension must be such that the weight of the mounting, and of the entire vehicle, can be carried by the supports.

Where the dimensions of the vehicle are not restricted and/or when a wide stable load-carrying platform is required to be supported on the vehicle, the mounting may comprise a plurality of beams or other slidable components arranged side by side. Thus it may comprise a pair of hollow outer beams, preferably attached to each other via one or more cross members. The mounting extension portions may each comprise a single inner ram-actuated beam slidably received in each end of each of the outer beams and may carry a single leg with ground engaging member as a support. For further structural rigidity the front inner beams may be connected to each other via a cross-member as may the rear inner beams. One or both mountings and the associated mounting extension may be of this construction. The mounting is generally pivoted through a central cross-member.

An alternative method of providing the slidable connection between the mounting and its extension is to mount the extension parts above, below or to one side of the mounting via brackets which carry slide guides which create a sliding channel. For instance for each extension portion there may be one bracket attached to the mounting which defines a channel through which the extension portion slides, and one bracket attached to the extension portion through which the mounting slides, or the mounting or the extension portion may have two or more brackets attached through which the other component may slide. Alternatively sliding channels may be formed on the outer surface of either the mounting or the extension portion and the other component could have sliders for sliding in the channel.

The mountings may be interconnected by the pivot means offset from one another but generally the mountings are arranged vertically above one another, and so the pivot means are preferably arranged substantially centrally on each mounting. The mountings must be interconnected in order that, when desired, movement of one mounting relative to its extension automatically causes corresponding movement with it of the other mounting. If the pivot means consist of a single, rigid pivot element then the pivot element alone will provide the necessary interconnection. However in some instances it is desirable that the pivot means should permit relative translational, or horizontal movement between the mountings in which event it may be desirable to provide additional means for inter-connecting the mountings when desired to ensure that it is possible to arrange that motion emparted to one of the mountings is automatically imparted simultaneously to the other mounting.

Translational movement of the mountings, either in the lengthwise direction of the mounting extensions or in a direction that has a component transverse to this, can be desirable as it permits additional freedom of manoeuvre. Generally the pivot means which connects the mountings may be fixed for rotation with either of the mountings, the other mounting carrying a bearing.

The means for rotating the mountings relative to one another can be by any suitable means. In one embodiment a pivot drive is fixed relative to one of the mountings to turn a gear ring fixed relative to the other mounting. The drive may drive the gear ring directly. In another embodiment the drive may comprise a pair of winches fixed relative to one mounting and a wheel around which a cable or chain is arranged and, which is fixed relative to the other mounting. The cable or chain can be pulled in either direction by the appropriate winch to turn the wheel and thereby rotate the mountings.

The mountings must be pivotable by a substantial amount, normally at least about 45° and preferably at least about 60°, in order that lateral stepping and/or rapid change of direction can be achieved. It is generally preferred that the mountings are pivotable by at least 90°, preferably in each direction from a central position in which the mountings are aligned. Pivoting by such an extent allows the vehicle to turn right angled bends, to the left or the right, so that it will be able to work easily in aisles of trees and in similarly restricted conditions. Preferably the mountings can pivot by 180° or even 360° relative to one another.

In order for the mountings to be able to rotate by the desired relatively large angles it is necessary for the supports to be arranged such that the sets of supports clear one another during pivoting of the mountings. This may be achieved by enabling any support on one mounting (generally the upper mounting) that will block the path followed by the other mounting and its supports during pivoting to be raised out of that path. The raising may be by retracting that support or supports vertically and/or by attaching the support or supports to their mounting extension by a joint which enables the supports to be folded or rotated up out of the path.

Instead of or as well as folding or raising the supports, the supports in one set can be very widely spaced with respect to the second, so that the second can rotate through at least 45° before striking the other supports.

Preferably or additionally all the supports connected to the first mounting extensions are capable of being located in a horizontal direction beyond supports in the second set so that the supports of the first set describe a circle about the pivot having a diameter larger than the separation of the supports of the second set. In this embodiment it is therefore possible to arrange, when it is desired to change direction, that the front and rear portions of the first mounting overhang the front and rear portions respectively of the second mounting to such an extent that the first set of supports describes a larger circle than the second set of supports with the result that the mountings can freely rotate without any of the supports fouling each other.

Preferably each set of supports comprises front and rear pairs of legs, although it is possible to provide support in different forms, for example comprising pairs of longitudinally or transversely arranged rails or endless tracks. It is generally preferred that at least one set of supports comprises pairs of front and rear legs.

The weight of the vehicle is transferred from one set of supports to the other by causing relative movement of the ground engaging members between a position in which the ground engaging members of one set are in a load bearing engagement with the ground and the other set are raised off the ground. This may be achieved by providing at least one of the sets of support with ankle, knee and hip joints but is preferably achieved by constructing the supports so that they are reciprocally extendible.

It is possible for only one set of supports to be reciprocally extendible, generally in a substantially vertical direction, but preferably both sets are reciprocally extendible. It may be desirable for each of the legs to be independently extendible and retractable so that for travel or standing on rough ground the vehicle may be steady on the uneven ground or so that the inclination of the work platform may be varied as desired. Generally the set of supports that is not load bearing is out of contact with the ground during the sliding of the extensions relative to the mountings. However, provided the ground engaging members do not drag on the ground with sufficient force to interfere with the sliding motion, it is possible for the non-load bearing ground engaging members to be in loose contact with the ground. On some occasions, for instance when the vehicle is stationary and is carrying a heavy load, it is desirable for both sets of supports to be load bearing so as to give extra stability.

The connection of the supports to the mounting extensions and the construction of the supports are preferably such that each leg is capable of rotating about two mutually substantially perpendicular axes. For instance, when a support comprises a yoke having a leg at each end, the legs may be fixed to an axle through the yoke, for rotation, and may be attached to the ends of the yoke via pins, about which they can rotate. Such attachment means enable the ground engaging members to be moved relative to their associated mountings but such movements are generally not the main mode of moving the vehicle itself, but enable the legs to be folded out of the way during rotation of the mountings or to be positioned for other manoeuvres.

The platform is present to carry work tools, heavy goods, driving cab, or any combination thereof. It may be a substantially continuous and substantially horizontal component or it may comprise a frame work or any other suitable means for mounting the tools, goods or cab relative to the remainder of the vehicle. The platform can consist of a single component or of two or more separate components. For instance there may be one platform component at one side or end of the vehicle and another platform component at another side or end of the vehicle. The platform, or a component thereof, maybe fixed below the lower mounting or on either or both sides of the mounting or on either or both ends of either mounting extension, but is generally fixed above the upper mounting.

The platform is secured on either or both of the mountings so that it is fixed relative to the pivot during "walking" so that it undergoes horizontal movement with the pivot and the mountings. It may be provided with a capability for some degree of movement relative to the pivot and mountings, for instance it may be capable of rotating, usually about the pivot, or of translating. Such movements may be useful during movement or, more usually, whilst the vehicle is stationary, to enable it to perform certain tasks. Generally it is most convenient for the platform to be immovably fixed to the upper mounting.

The platform, and therefore the vehicle, is preferably capable of carrying a wide range of tools. The vehicle is suitable for various silvicultural operations including planting seedling trees, tending plantations and thinning juvenile stands of naturally re-generated trees. The vehicle may have an array of tools for such operations at one or both of its sides or ends. The tools are in general attached to the work platform although some may be attached to other parts of the vehicle. The tools are usable over an area of ground whilst the vehicle is stationary by virtue of the tools being carried by the yokes or by virtue of the ability of the work platform to rotate about the pivot and sometimes also to move horizontally relative to the pivot. Preferably the vehicle has sets of tools at two opposite ends of the work platform thus enabling a wider area to be worked whilst the vehicle is stationary (except for pivoting movement). In the preferred embodiment in which the capable of pivoting by at least 90° from the central position in each direction, the vehicle is capable of working the areas of ground to each side of the vehicle at approximately right angles to the general direction of stepping movement.

Instead of being used in silviculture the vehicle can be used for transporting tools or other goods over various types of bad terrain for agricultural or other purposes. The ground engaging members will be constructed to suit the terrain, eg having a suitable non-slip surface area for travel over rocks and a large surface area for travel over snow or boggy land or sand.

The vehicle may be operated by one or more operators seated in the vehicle for example in a conventional cab carried on the work platform. The operator may control the movement of the vehicle as well as operation of the tools. Alternatively or additionally the control of movement and/or tool operation may be semi or fully automatic.

The vehicle in use will include one or more power supplies for effecting the reciprocal vertical movement of the supports, the reciprocal horizontal movement of the supports and the pivoting movement of the mountings. It may be desirable in some conditions to have more than one power unit, for example where there are steep hills to be climbed but where otherwise this amount of power is not needed. However, in order to keep the vehicle as light as possible it is preferred that it comprises a single power unit. The vertical and horizontal movements of the supports are preferably all by hydraulic or pneumatic power but other power system, eg electro-hydraulic, mechanical or electrical can be used.

A preferred vehicle according to the invention in addition to being able to travel by a stepping motion, is also provided with a set of wheels or an endless track connected to a power unit for travel along relatively level terrain, trails and made up roads. The supports of such a vehicle are retractable to positions such that the vehicle may more freely over the ground whilst supported by the wheels or track. The advantage is that the speed of travel on the wheels or track is greater than that possible by the stepping mode. The wheels may be driven by the same power unit as the movements of the supports or by a separate power unit. In one embodiment the wheels or tracks are provided as a separate unit or units which can be attached and detached from the vehicle. The unit(s) may be attached to the lower mounting or to the supports.

Steering may be by conventional means, for instance by providing the front and/or rear wheels with steering ability whilst maintaining their axles perpendicular to the longitudinal axis of the vehicle. In a preferred embodiment the vehicle is provided with a "skidder-type steering" mechanism. This is produced by attaching a pair of wheels to the front of one mounting or its supports and another pair of wheels to the rear of the other mounting or its supports. Steering can then be achieved by relative rotation of the mountings.

The provision of a platform that is fixed relative to the mountings and the pivot and the provision of means for sliding mounting extensions, and thus the supports, relative to the mountings, gives vehicles of the invention numerous advantages over the prior art, particularly over EP-A-157633. By providing means whereby the mountings can move relative to both sets of ground engaging members simultaneously it is possible for the vehicle to "walk" by a double cycle action. Whilst one set of supports take the weight of the vehicle and the associated mounting is slid relative to its mounting extension, the other "unladen" set of supports is slid relative to its associated mounting to prepare for the next step. The pivot, mountings and work platform can all move forward with each step so that continuous motion of the work platform cam be achieved. In EP-A-157633 the load on the upper main body moves only with alternate steps.

A further advantage is that the mountings, pivot and work platform cam all be moved in a horizontal direction whilst all the ground engaging members are in contact with the ground. This is particularly useful where the load is very heavy and/or extra ground contact is required. In such a mode of movement the mountings are slid in the same direction relative to both sets of supports. Each set of supports can be prepared for the next step by sliding their associated extension relative to its mounting whilst the weight of the vehicle is retained on the other set of supports and the work platform remains stationary. This mode of movement is not possible with the vehicle in EP-A-157633.

A yet further advantage is that since the work platform can remain translationally fixed relative to the pivot and mountings during "walking" the vehicle remains stable if the weight is relatively evenly distributed across the vehicle, and thereby acting approximately down near the pivot, which always has ground engaging members of supports in front and behind it. In contrast, since the load in EP-A-157633 is fixed on the upper main beam to which legs are attached, when the vehicle is supported on the lower legs at the end of a step the vehicle could become unstable unless the step is made relatively short with respect to the length of the vehicle. The vehicles of the present invention can walk using a longer step for the same length of vehicle.

The optional independent extension and retraction of the front and rear mounting extension portions provides further advantages over EP-A-157633, especially the ability to avoid collision of upper and lower mounting extensions and supports during rotation of the mountings.

Figure 2:
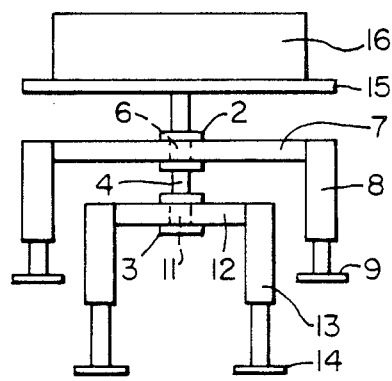
FIG. 2 is a schematic end on view of the vehicle shown in FIG. 1.

Referring to FIGS. 1 and 2, a vehicle 1 comprises an upper mounting 2, a lower mounting 3, pivot means 4, first forward and rear mounting extensions 5 and 6 respectively, second forward and rear mounting extensions 10 and 11 respectively, a first set of supports 8 having ground engaging members 9, and a second set of supports 13 having ground engaging members 14, and a platform 15 mounted on the first support.

The first and second mountings 2 and 3 are hollow beams and the extensions 5, 6, 10 and 11 are hollow beams that are received slidably within the outer hollow beams 2 and 3 and they are independently actuable by hydraulic ram means (not shown). To the outer end of each inner beam is connected a transverse yoke 7. To each end of each yoke is attached a leg 8 which is extendible and retractable by hydraulic means (not shown). Each leg has a ground contacting foot 9. A yoke and its attached legs and feet form a support. The lower outer hollow beam 3 likewise carries two hydraulic ram-actuated inner beams 10 and 11 each carrying a transverse yoke 12. At each end of each yoke is an extendible leg 13 with a ground contacting foot 14. In the embodiment shown the yokes 12 attached to the lower beam are shorter than the yokes 7 attached to the upper beam so that as the inner beams 5, 6, 10 and 11 are actuated within the outer beams the lower and upper legs may pass each other freely. This ability is more clearly shown in the plan views FIGS. 3a and 3b.

In the position shown the weight of the vehicle is being born on the extended lower legs. The weight could be transferred to the upper legs by extension of the legs 8 followed by retraction of the legs 13 (or vice versa).

Attached to the upper mounting 2 is a work platform 15 which carries a set of tools 16 at its front and rear ends. The platform could alternatively or additionally carry a cab for a driver. The tools are shown diagrammatically in the figure and may in practice comprise tools for planting, tending or thinning. As well as being mounted on the platform 15 other tools 16 may be mounted on the yokes 7 or on platforms secured to them.

Figure 3A:
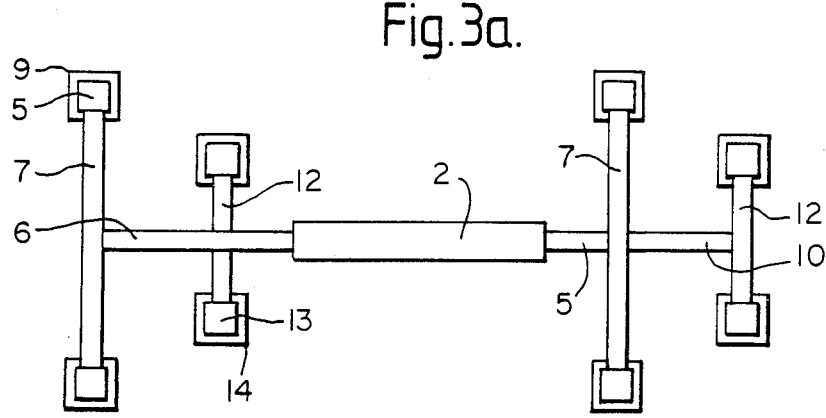
FIG. 3a is a plan view of the vehicle shown in FIG. 1 omitting the work platform.
Figure 3B:
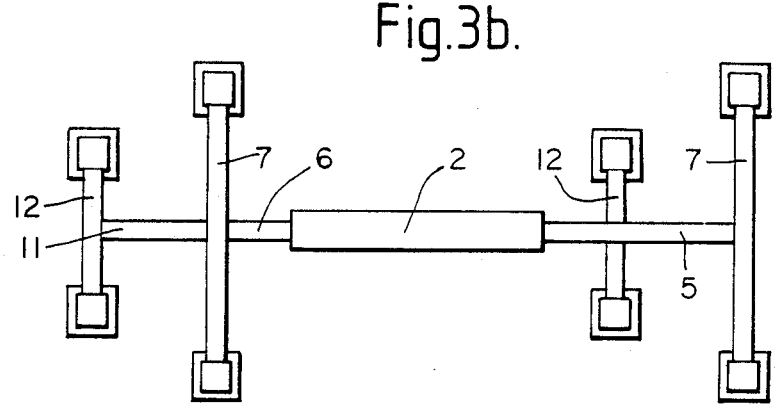
FIG. 3b is a plan view similar to that shown in FIG. 3a in which the vehicle has taken a single step.

FIG. 3a shows a plan view of the vehicle in the position shown in FIGS. 1 and 2, but omitting the work platform for clarity. The supports 12 initially serve as the load bearing supports. The mounting extension portions 11 and 12 are caused to slide relative to the mounting in a first direction, to the left, but as the supports are in the load bearing position this causes the mounting to slide in the opposite, second direction, namely to the right. Simultaneously the first mounting extension 5 and 6 is slid to the right, i.e. in the second direction. In particular hydraulic power operates to extend front upper inner beam 5 and to retract rear upper inner beam 6 and simultaneously to retract front lower inner beam 10 and to extend rear lower inner beam 11. When the inner beams are fully extended or retracted, as appropriate, the vehicles legs will be in the position shown in FIG. 3b. To continue the rightward movement the legs 8 of the upper beam will be lowered until they reach the ground, the legs of the lower beam will be retracted until they are clear of the ground and the extensions and retractions of the inner beams 5, 6, 10 and 11 will be reversed until the position shown in FIG. 3a is reached. This mode of travel is a double cycle mode. The vehicle could alternatively travel by a single cycle mode in which only one of the sets of inner beams 5, 6, or 10 and 11 extends and retracts for instance if the other set breaks down. Also the vehicle could move in a similar manner if only one set of legs 8 or 13 were able to extend and retract, although this is less preferred.

Figure 4:
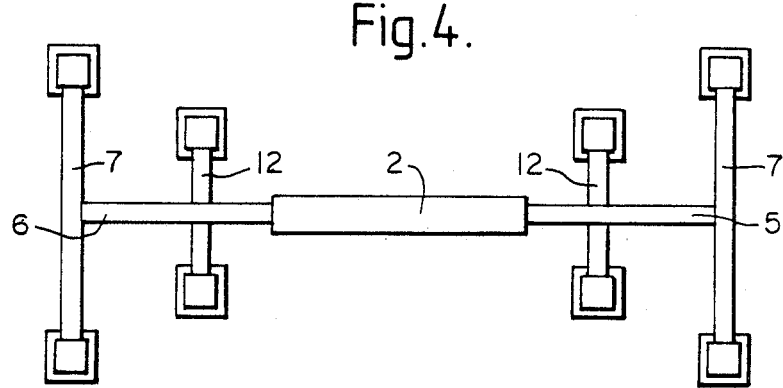
FIG. 4 is a plan view of the vehicle omitting the work platform with the supports in position ready for pivoting.

In order for the direction of travel to be changed or for the work platform to be pivoted so that the tools 16 could work over an area to the sides of the vehicle then the inner beams 5, 6, 10 and 11 are moved so as to reach the position shown in FIG. 4. In this position the lower inner beams 10 and 11 are fully retracted and the upper inner beams 5 and 6 are fully extended. In this position the outer beams 2 and 3 may pivot by any desired angle without the upper and lower legs colliding. Pivoting may be affected whilst the weight of the vehicle is supported on either set of legs. With the weight supported on the upper legs 8 the lower outer beam may be turned, for instance, anticlockwise through 90° to the position shown in FIG. 5a. Further movement of the vehicle along the axis of outer beam 3 may be effected by extension of the lower legs 8 and retraction of the upper legs 13 followed by pivoting of the upper outer beam 2 until it again lies parallel with the lower beam outer 3 when the normal stepping motion of the vehicle may proceed.

Starting from the position shown in FIG. 4 with the lower legs extended, the upper beam outer may be pivoted anticlockwise through 90° until it reaches the position shown in FIG. 5b. In this position the tools carried on the work platform may be actuated to work the ground at each side of the vehicle. Alternatively the direction of movement of the vehicle may be altered by a similar sequence of movement as described above in connection with FIG. 5a. FIGS. 5 and 6 show a plan view (omitting the platform) and side view, respectively of an alternative embodiment of vehicle of the invention. The vehicle is similar to that in the previously described specific embodiment, having upper and lower outer beams 2' and 3', connected via pivot means 4' and each having front and rear inner beams 5', 6', 10' and 11' slidable received in their ends. A yoke 7' is attached at the distal ends of the upper inner beams 5' and 6' and has legs 8' having feet 9' at each of its ends. Similarly a yoke 12' with legs 13' and feet 14' is connected to each end of lower inner beams 10' and 11'. The sliding of the inner beams in the outer beams is activated by hydraulic cylinders (not shown) as is the extension and retraction of the legs. The upper outer beam 2' carries a work platform 15' which in this embodiment carries a drivers cab 17.

The legs of the vehicle illustrated in FIGS. 5 and 6 are fixed to the yokes so as to be rotatable relative to the yoke about two mutually substantially perpendicular axes. One of the modes of rotation is provided by fixing each legs to an axle which is arranged longitudinally with respect to the yoke. The axle can be rotated, e.g. so that both legs of a pair rotate in concert or independently. The other mode of rotation is provided by mounting the legs on a pin 18 passing through the leg at its upper end and fixed to the end of the yoke. The rotation about the pin may be actuated by hydraulic cylinders (not shown) fixed to the yoke and the leg.

Figure 8:
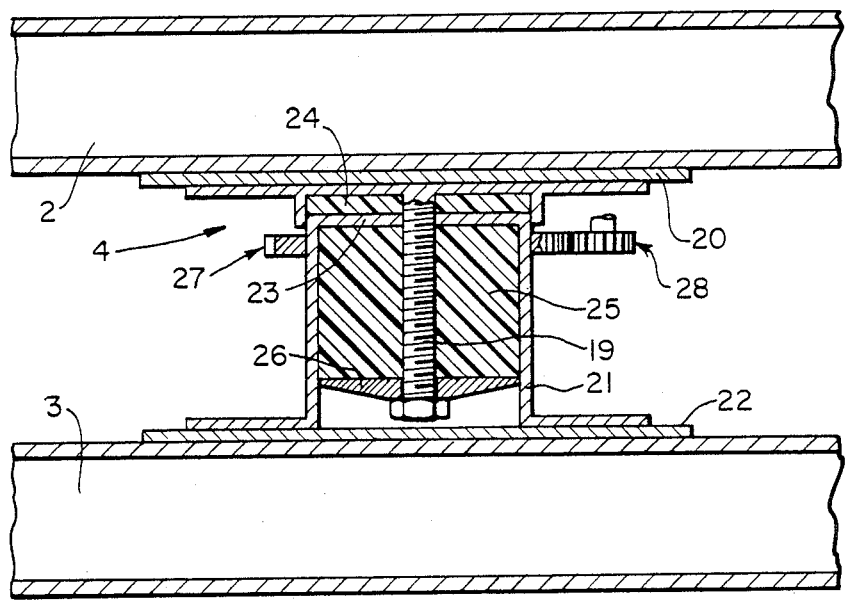
FIG. 8 is a cross-section through one type of pivot means for connecting the mountings.

FIG. 8 shows a cross-section through one arrangement of the pivot means 4 and its attachment to the upper and lower outer beams 2 and 3. A pivot 19 is permanently fixed to a plate 20 which is bolted or otherwise fixed to the upper outer beam 2. A bearing housing 21 is permanently fixed to a plate 22 which is bolted or otherwise fixed to the lower outer beam 3. The upper wall of the housing carries a bearing surface 24 usually of resin about which the pivot rotates and against which the pivot bears when the upper beam is carrying the weight of the vehicle. The pivot is received in the housing through an annular bearing 25, usually of resin, within which it can rotate. The lower end of the pivot is attached to a ring 26 which fits under the bearing 25 and bears against that bearing when the weight of the vehicle is carried by the lower beam.

A gear wheel 27 is attached to the perimeter of the bearing housing and is driven by a pivot drive 28 which is connected to the upper beam (means of attachment not shown). Actuation of the pivot drive causes relative rotation between the pivot and the bearing housing and thereby causes relative rotation between the upper and lower outer beams 2 and 3.

Figure 9:
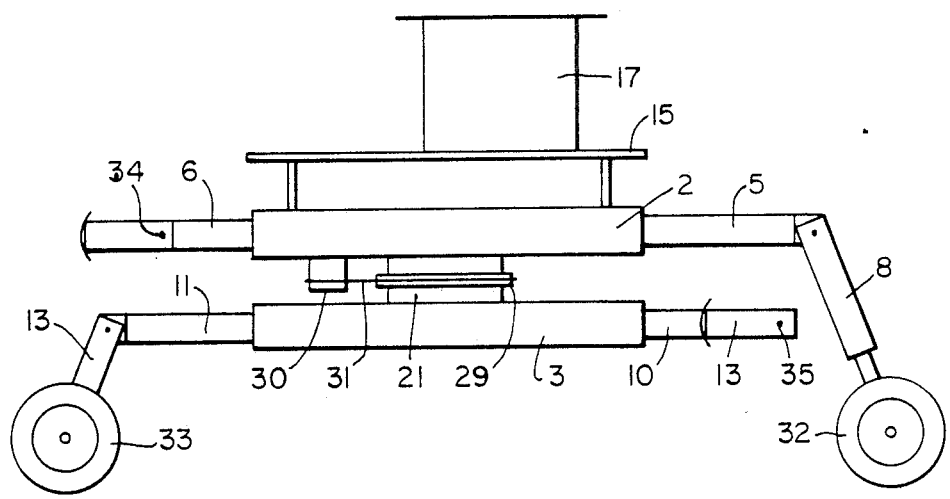
FIG. 9 is a schematic side view of a third embodiment of the invention provided with a set of wheels.

In FIG. 9 an alternative form of pivot drive is shown. A wheel 2a is fixed around the bearing housing 21 which is fixed relative to the lower beam 3. To the under side of the upper beam 2 are fixed two winches, one of which is shown 30. A cable or chain 31 passes around the wheel 29 and each of the winches 30, which can winch it to rotate the outer beams.

FIG. 9 also illustrates one embodiment of a vehicle having a set of wheels. A first pair of wheels 32 is fixed to the front pair of legs 8 of the front upper inner beam 5. A second pair of wheels 33 is fixed to the rear pair of legs 13 of the rear lower inner beam 11. The wheels can be driven (drive means not shown) to move the vehicle. The vehicle can be steered by rotating the outer beams relative to one another using the winches 30, which moves the pairs of wheels relative to one another.

FIG. 9 also illustrates how the legs to which no wheels are attached can be folded out of the way. Thus the legs attached to the upper rear inner beam 6 are rotated about axis 34 until they extend rearwardly away from the mounting 2 so as not to interfere with the rear part of the lower mounting, beams and supports. The legs 13 attached to the lower front inner beam 10 are rotated about axis 35 so that they extend rearwardly towards the lower mounting 3 and do not interfere with the front part of the upper mounting, its inner beams and supports.

I claim:

1. A vehicle comprising:
   a first substantially horizontal mounting;
   a second substantially horizontal mounting beneath the first mounting;
   pivot means by which the 1st and 2nd mountings are pivotally interconnected;
   means for rotating the mountings relative to each other about the pivot through at least about 45°;
   substantially horizontal, first and second mounting extensions, each comprising front and rear portions and slidably mounted on, respectively, the first and second mountings for longitudinal motion relative to the mountings;
   means for reciprocally sliding each substantially horizontal mounting extension longitudinally relative to its associated mounting, and
   first and second sets of supports for alternately supporting the mountings above the ground and that include ground engaging members and that are connected, respectively, to the first and second mounting extensions at the ends of the extensions distant from the mountings,
   means for raising and lowering the ground engaging members of one set above or below the ground engaging members of the other set whereby each set of supports may alternately serve as a load bearing set of supports that support the mounting above the ground and the ground engaging members of which are in a load bearing contact with the ground,
   and in which a work platform is secured on the first or second mountings for substantially horizontal movement with the mountings and the pivot,
   and the means for sliding the mounting extensions comprise
   means for sliding the mounting extension connected to the load bearing supports in a first direction relative to its associated mounting and thereby moving the pivot in a second opposite, direction relative to the load bearing supports, and
   means for simultaneously sliding the other mounting extension relative to its associated mounting in the said second direction.

2. A vehicle according to claim 1 in which each mounting comprises a hollow beam arranged longitudinally with respect to the vehicle and the mounting extensions comprise inner beams received in and slidable within the hollow beam, and in which the means for sliding the extension comprise means for causing the inner beams to slide in the outer beams.

3. A vehicle according to claim 1 in which the front and rear portions of the mounting extension are separate components and are separately slidable relative to their associated mounting.

4. A vehicle according to claim 1 in which each mounting comprises a hollow beam arranged longitudinally with respect to the vehicle and each mounting extension comprises front and rear portions separately slidable within the associated hollow beam and in which there are means for sliding each portion separately within the associated beam.

5. A vehicle according to claim 1 in which each mounting comprises single beam and each support comprises a yoke fixed to the mounting extension and having a leg attached to each of its ends.

6. A vehicle according to claim 1 in which the mountings are pivotable by at least about 90° in each direction from a central position in which the mountings are aligned.

7. A vehicle according to claim 1 in which the first mounting comprises a pair of interconnected hollow beams arranged in side by side relationship.

8. A vehicle according to claim 1 in which the mountings, the mounting extensions and the supports are arranged such that the upper and lower sets of supports clear one another during relative pivoting of the mountings.

9. A vehicle according to claim 8 in which any supports on a mounting that would block the path followed by the other mounting and its supports during pivoting are provided with means for raising them out of that path.

10. A vehicle according to claim 8 in which all the supports of the first set are capable of being located in a horizontal direction beyond supports in the second set so that the supports of the first set describe a circle about the pivot having a diameter larger than the separation of the supports of the second set.

11. A vehicle according to claim 9 in which the said means for raising supports comprise means for hinging the supports outwardly.

12. A vehicle according to claim 1 in which the means for raising and lowering the ground engaging members comprise means for reciprocally extending the supports substantially vertically.

13. A vehicle according to claim 1 comprising also a set of wheels or endless track connected to a power unit and in which the supports are retractable to positions such that the vehicle may move freely over the ground whilst supported by the wheels or track.

14. A vehicle according to claim 1 in which the ground engaging members of both sets of supports are capable of simultaneously being in load bearing contact with the ground so that both sets of supports are load bearing supports, and further comprising means for simultaneously sliding both of said mounting extensions relative to their associated mountings in said directions when both sets of supports are acting as load bearing supports.

15. A vehicle according to claim 1 in which each mounting comprises a single hollow beam arranged longitudinally with respect to the vehicle, each mounting extension comprises front and rear portions separately slidable within an associated hollow beam, each support comprises a yoke fixed to each portion of the mounting extension and having a leg attached to each of its ends, and in which there are means for sliding each front and rear mounting extension portion separately within the associated mounting beam.

16. A vehicle according to claim 15 in which the mountings, the mounting extensions and the supports are arranged such that the upper and lower sets of supports clear one another during relative pivoting of the mountings.

* * * * *